Figure 1:
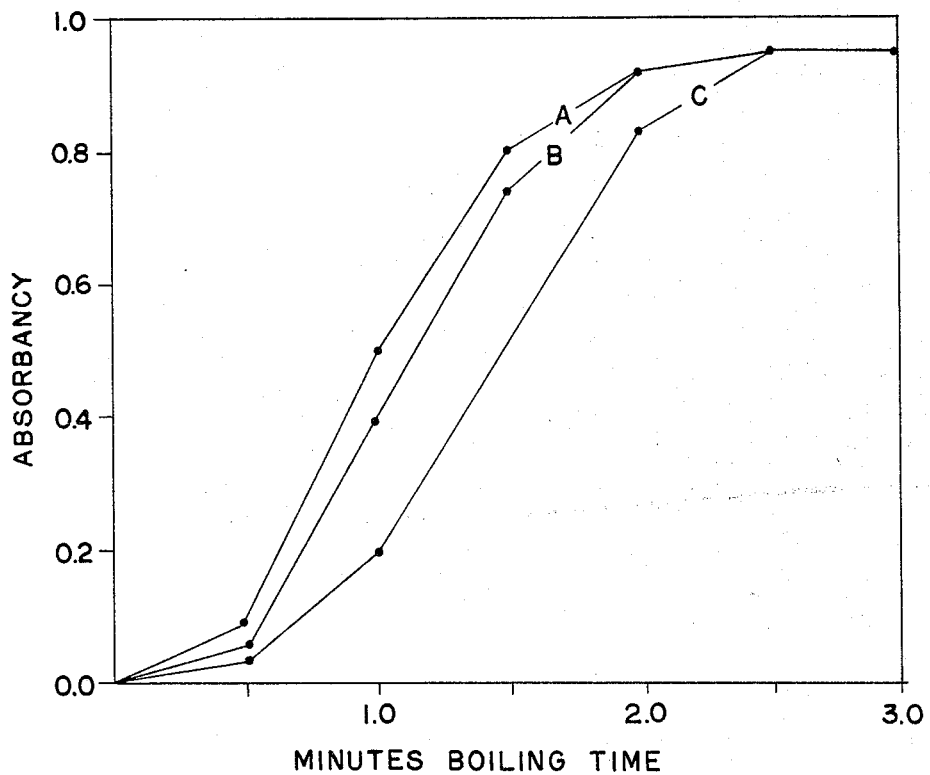

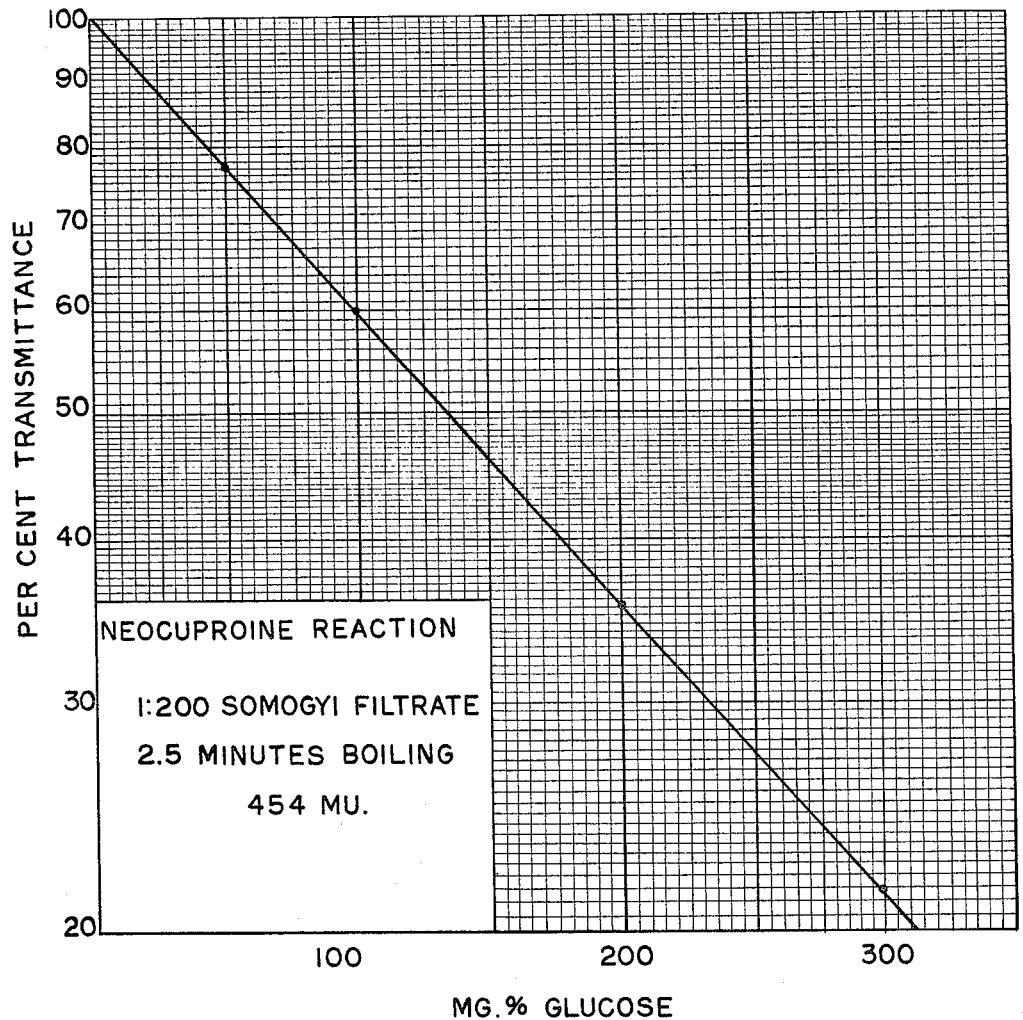

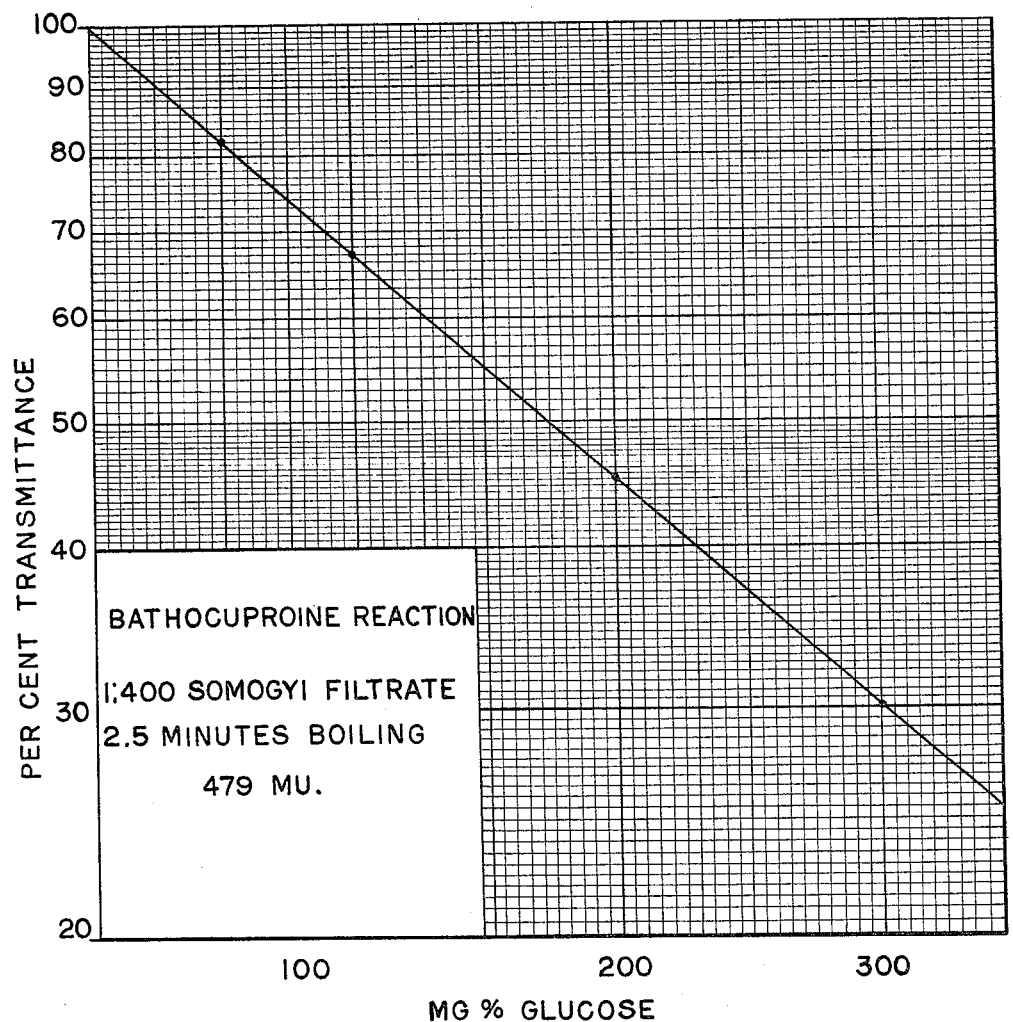

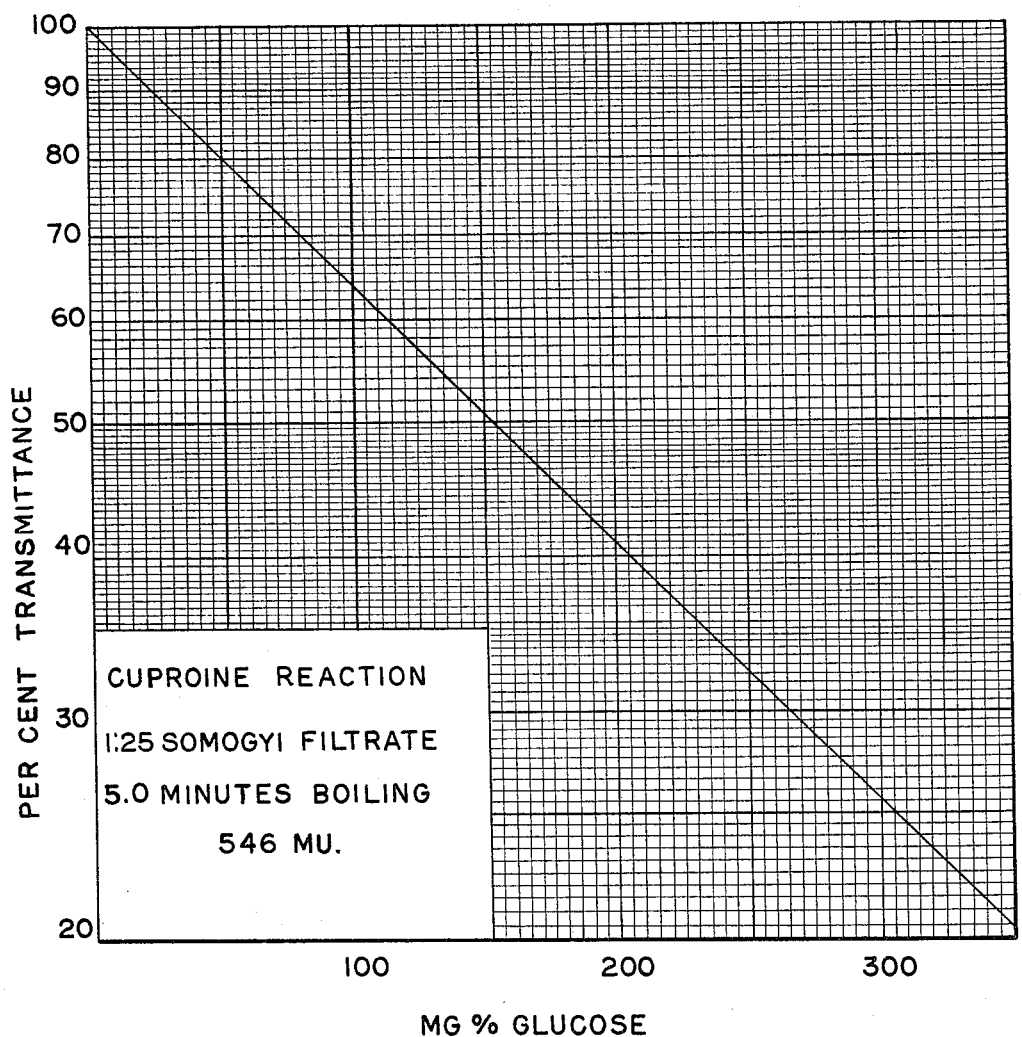

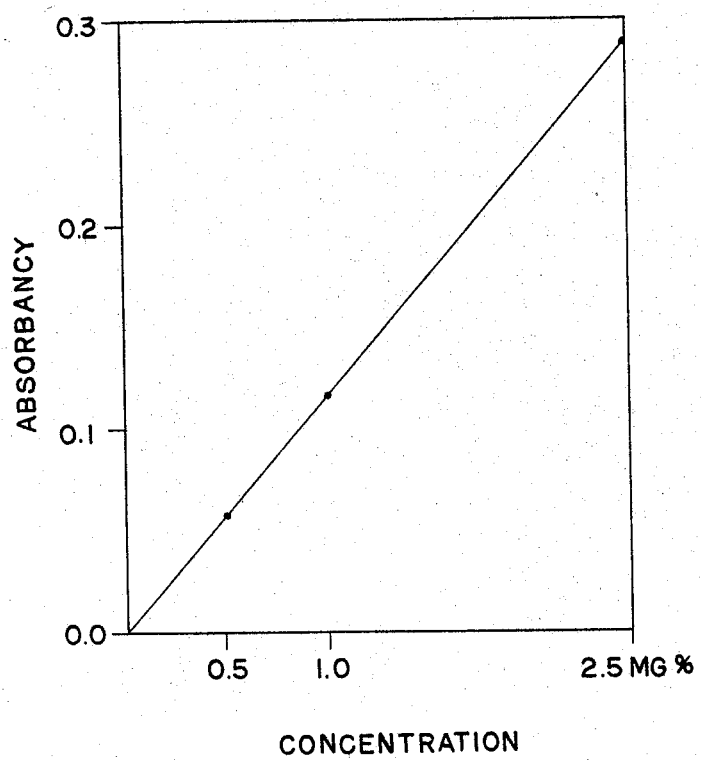

REDUCTION OF THE INDICATOR BY GLUCOSE IN THE PRESENCE OF URIC ACID AND CREATININE

URIC ACID (5 MG %) AND CREATININE (2 MG %) WERE ADDED TO THE SAME 100 MG % GLUCOSE STANDARD

United States Patent Office 3,282,649
Patented Nov. 1, 1966

3,282,649
DETERMINATION OF OXIDIZING AND
REDUCING SUBSTANCES
Donald L. Bittner, St. Mary's Hospital, 2200 Hayes St.,
San Francisco, Calif.
Filed May 4, 1962, Ser. No. 192,564
15 Claims. (Cl. 23—230)

This invention relates to the analysis of materials in order to determine the presence of amount of oxidizing and reducing substances which may be present therein. More particularly, this invention relates to the determination of oxidizing and reducing substances in solution wherein the determination is based upon the detection of a color change in a chelate caused by the valence change thereof and which is initiated by the oxidizing or reducing substance.

The gist of the present invention lies in the use of certain copper-phenanthroline or copper-biquinoline chelates as indicators. The particular phenanthroline and biquinoline chelating agents or compounds employed are specific for copper and do not chelate with other metals. The particular chelate used is preformed so that all of the copper is substantially completely bound by the chelating agent when it is used in a solution containing the material to be analyzed. Suitable conditions are employed to cause the oxidizing or reducing substance in solution to change the valence state of the bound copper.

The chelates used as indicators are characterized by a pronounced change in color when the bound copper undergoes a change in valence state. The indicators are further characterized by the fact that the color in the solution produced by the indicator is in consonance with Beer's Law at least over the ranges of interest. Consequently, the amount of oxidizing or reducing substance is readily determinable by employing conditions which are effective to reduce or oxidize the copper-phenanthroline or biquinoline indicator by the substance to be analyzed and the amount of oxidizing or reducing substance may then be determined by conventional colorimetric or equivalent techniques.

Thus, in a preferred embodiment involving a method for the colorimetric quantitative analysis of glucose in deproteinized blood serum, the present invention comprises contacting a predetermined quantity of blood serum which has been deproteinized with an indicator consisting essentially of a chelate of substantially completely bound copper in cupric state with a member of the group consisting of 2,2'-biquinolines and 2,9-substituted-1,10-phenanthrolines in alkaline aqueous solution of predetermined volume and under copper reducing conditions, and then measuring the amount of copper that is reduced to the cuprous state by reference to the light transmittance of the aqueous solution. As is well understood by those skilled in the art, the amount of glucose may then be calculated by reference to a standard glucose solution that is processed similarly to the substance being analyzed.

Modern methods for the determination of blood glucose began in 1920 with the introduction of the well known procedure proposed by Folin and Wu which made the laboratory determination of glucose practical enough to establish is at one of the most common chemical procedures performed in the clinical laboratory. The most significant contribution of this procedure to the study of glucose in body fluids has been its demonstration to the clinical laboratory that monosaccharides have the ability to reduce certain metallic ions in hot alkaline solution and that this reduction can be controlled with an accuracy acceptable enough to be useful in medicine as well as industry.

Although the reduction of metallic ions other than copper by glucose has been demonstrated, the use of cupric ion for this purpose has retained considerable popularity as evidenced by the multitude of variations on the basic technique. The main objectives of many of these modifications of the basic method has been to design a test for the quantitative determination of glucose that would be more specific for glucose, offer greater stability of reagents, and greater stability of the final color reaction. Other modifications have been proposed that represent an attempt to dispense with the constricted sugar tube which was necessary to the first sugar analysis methods in order to control the reoxidation of the copper.

In general, all of the workers in the field were faced with the problem of keeping the copper in solution and from preventing it from becoming reoxidized. To this end it has been the practice to use tartrate and/or sulfate in the solution along with the copper and other reagents.

More recently it has been proposed to complex the reduced copper in an alkaline tartrate solution containing sulfate ions and with a phenanthroline compound similar to some of the presently used materials. See article by Mayo E. Brown, M.S., The Journal of the American Diabetes Association, January–February 1961, vol. 10, No. 1, pp. 60–62. These recent techniques include the addition of the complexing agent for the copper indiscriminantly to the alkaline copper tartrate solution. As a result not all of the cupric ions are bound to the complexing agent because of the presence of the tartrate and because of an excess of the cupric ions.

It has been discovered that the presence of an excess of cupric ions and/or the presence of tartrate ions and/or the presence of chloride ions cause the reoxidation of the cupric ions during the primary reducing process. As a result even with these most recent efforts, in order to counteract the reoxidation, an ordinary test tube cannot be used. Instead, a constricted boiling tube is necessary and/or the presence of sulfate ions. Even with these latter precautions results are inconsistent.

The present invention includes the use of copper chelates which dispense with the need for tartrate or other hydroxy acids previously needed to suspend the cupric ion in solution, and also dispenses with the need for other salts customarily added to the solution to prevent reoxidation such as sulfate salts. All excess copper is removed from the solution prior to the determination of the oxidizing or reducing substance and the remaining copper is substantially completely bound to the complexing agent.

Reoxidation phenomena characteristic of prior methods have been eliminated by the present invention. With this control of reoxidation an ordinary straight walled test tube or other suitable vessel is conveniently used. Control of reoxidation of the cuprous ion as occurred in the analysis of glucose for example, has allowed a very short boiling time as compared with the prior art. Moreover, the final color complex is stable for five days or longer imparting obvious advantages in colorimetric analyses.

In practicing the present invention the copper is complexed with a substituted phenanthroline, more specifically a 2,9-substituted-1,10-phenanthroline or a 2,2'-biquinoline. Broadly, the present invention may be practiced with any organic compound including the following structural elements:

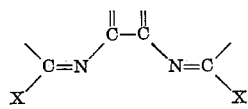

wherein X may be any organic radical including alkyl radicals such as the methyl and ethyl groups, aromatic radicals such as the benzene ring, and the like. The open valences on the carbon atoms are suitably joined to each other through other carbon atoms thereby forming ring structures.

More specifically, the complexing agent is preferably selected from the group consisting of cuproine (2,2'-biquinoline), neocuproine (2,9-dimethyl-1,10-phenanthroline), bathocuproine (2,9-dimethyl - 4,7 - diphenyl - 1,10-phenanthroline), and water soluble salts thereof such as the hydrochloride and hydrosulfate salts. Suitable complexing agents also include materials such as the foregoing preferred materials wherein the rings are further substituted. For example, the neocuproine and bathocuproine noted above may have substituted in their five and/or six positions, alkyl groups, hydroxy groups, nitro groups, halogen atoms, and the like.

The copper-phenanthroline of biquinoline complex is in many ways similar to the iron-phenanthroline indicator system. The copper indicator system appears to be equally as useful as the iron-phenanthroline system and has certain advantages that give better stability to the color complex in aqueous solution particularly in the analysis of reducing substances.

In contrast to the iron-phenanthroline system both the cupric and cuprous ions appear to be tightly bound in the chelate with very little evidence of deterioration of either complex in hot alkaline solution. In addition, once a fraction of the cupric chelate has been reduced to the cuprous form under these conditions, the resulting color complex is stable at room temperature for more than four days. No additional stabilizing agents are needed and other complexing agents are not necessary to suspend the cupric ion. By combining the ionic copper with the substituted phenanthroline or biquinoline in a 1:2 molecular ratio, the chelate then serves as a quantitative oxidation or reduction indicator, the color either intensifying or fading in proportion to the number of cupric or cuprous ions formed under the conditions of the test. Because the chelate is so tightly held, reoxidation is no longer evident.

The present indicators are operable broadly in the analysis of oxidizing and reducing substances in liquid phase. One area of great utility is in the analysis of blood for the various reducing substances present. In this respect it is contemplated that the present method may be used in analyzing both the cellular fractions and the plasma fractions of blood. In the cellular fraction of blood, for example, the present indicators are useful in determining glutathione. In the plasma fraction which is most preferably employed in its serum form, a number of substances are conveniently analyzed. These include glucose, creatinine, uric acid, and ascorbic acid.

In carrying out the invention the oxidation and reduction reactions involved are normally executed in liquid phase which may be water or a suitable organic solvent such as acetone, ethanol, chloroform, ethyl acetate, amyl acetate, carbon tetrachloride, benzene, dioxane, and the like. The indicator comprising the copper substantially completely bound to a suitable phenanthroline or biquinoline chelating agent is added to the solvent including the oxidizing or reducing substance. The indicator may be added in solid form but is preferably added as an indicator solution in one of the suitable solvents. A working indicator solution may also contain other substances such as alkali when appropriate.

The copper is employed in either a cupric or cuprous form depending upon whether a reducing or oxidizing substance, respectively, is being analyzed. Suitable conditions such as the proper selection of pH and addition of heat are applied so as to cause the copper to be reduced or oxidized as the case may be.

The indicators here involved have a brilliant and distinctive color change when going from the oxidized to the reduced form and vice versa. For example, cuproine is purple in the cuprous form and light green in the cupric form. The color change of the indicator may be used to determine the amount of oxidizing or reducing substance in the solution to be analyzed by conventional titrimetric, gasometric, and colorimetric techniques as well understood in the art.

In the preferred embodiment of the present invention for the analysis of glucose in blood serum, suitable reducing conditions include the existence of an alkaline solution preferably having a pH of at least about 10. This may be accomplished by the addition of alkali such as sodium hydroxide to a solution of the indicator. Preferably, the alkaline condition is obtained by the addition of carbonate as from sodium carbonate.

When using sodium carbonate, generally the reduction of the indicator takes place more rapidly in a more concentrated solution. Thus completion of reduction in a 4% sodium carbonate solution is more rapid than in a less concentrated solution such as a .1% concentration. It has been found that about a 1% carbonate solution is satisfactory for rapid completion of the reaction for most purposes (2.5 minutes) while the color developed does not deteriorate if the accompanying heating time exceeds this time of maximum color development.

When analyzing for oxidizing or reducing substances other than glucose and in mediums other than blood or blood serum, the selection of the pH generally should be made in accordance with conditions known in the art to cause the substance to oxidize or reduce copper. In all cases, including glucose, heat may be necessary (as from a water bath) to accelerate the reaction time.

In the present method, the copper-phenanthroline or biquinoline indicator is placed in the solution to be analyzed in an amount sufficient to react with all of the oxidizing or reducing substance in the solution, although an excess is advantageously present. Again, in the case of glucose in blood serum, it has been found that an indicator solution concentration for addition to the serum sample that contains about 7.5 mg. percent of hydrated copper salt has been quite satisfactory. For example, the use of a working indicator solution that contains about 7.5 mg. percent of hydrated cupric sulfate is quite satisfactory for the reduction of a 300 mg. percent glucose standard under the conditions described herein.

The concentration to be employed is subject to considerable variation depending upon the materials being analyzed. However, too low an indicator concentration should preferably be avoided since a certain amount of stearic hindrance occurs at the very low concentrations. Thus while a 7.5 mg. percent indicator concentration of copper salt is suitable for use on a 300 mg. percent glucose standard, suitable results may still be obtained where the indicator concentration is dropped to 2.5 mg. percent copper salt. On the other hand, stearic hindrance may become a factor if the indicator concentration of copper salt is dropped considerably below that to about 1–1.5 mg. percent.

In any event it is to be stressed that sufficient chelating agent must be present to substantially completely bind whatever amount of copper is selected. This can be readily calculated since two molecules of chelating agent are required for each copper atom.

As previously pointed out, the fluid surface area in contact with the air is not critical in the present method as contrasted with previous methods which required the use of constricted sugar tubes or substitute techniques to avoid reoxidation of the cuprous ion during boiling and other reducing conditions. These conclusions are based on experiments employing three different boiling vessels presenting variable fluid surfaces in contact with the air. Whereas it was observed that the vessels having the smaller contact with the air caused a color in the indicator to develop sooner, the reaction occurring in all size vessels finally developed the same density of color when allowed to continue to completion. Consequently, it has been concluded that the difference in the rate of color devlopment is related to the difference in time required to heat the solutions in the different vessels to a temperature necessary for reduction of the copper, and that if there is any re-oxidation in the present method, it is not related to the fluid surface area exposed to the air. These facts are illustrated in FIG. 1 where three samples lettered A, B and C are graphically described. A was run in a 13×100 mm. test tube, B in a 17×150 mm. test tube, and C in a 30 ml. Kjeldahl round bottom flask. A 300 mg. percent glucose standard was used in each case with appropriate blanks. The indicator and general procedure of Example I hereinafter described were followed.

The present method and indicator are illustrated by the following examples dealing with the determination of glucose in blood serum.

EXAMPLE I

*Analysis of glucose with copper-neocuproine indicator*

*Concentrated indicator solution.*—15 mg. of the hydrated form of cupric sulfate was added to 50 ml. of an aqueous solution containing 100 mg. of neocuproine hydrochloride. Water free of metallic ions and reducing substances is used for this purpose. A cupric chelate is formed which is green in color. The cupric ion remains in solution when added to an alkaline medium. This concentrate is stable at room temperature for at least two months.

In this form the chelate serves as a quantitative reduction indicator which then may be added to either alkaline or acid solution to determine the presence of (or the concentration of) reducing substances under the conditions of use. If the copper is obtained in the cuprous form it may be converted to the cupric form with a suitable oxidizing agent. Conversely, if the cupric form is obtained and the indicator is to be used to detect oxidizing substances, it may be converted to the cuprous form with a suitable reducing agent.

*Working reagent for analysis of glucose.*—5 ml. of the concentrated indicator solution is added to 95.0 ml. of an aqueous solution of 1% sodium carbonate. This reagent has a very slight bluish-green tint and remains clear without significant auto-reduction of cupric ion for several days at room temperature. The pH for the solution is 10.8.

*Application to blood serum.*—Oxalated blood is collected in the usual fashion. A drop of blood from the finger may be used if the latter is placed immediately in the sodium or barium hydroxide used to precipitate the proteins. A 1:200 or 1:100 barium or sodium hydroxide-zinc sulfate filtrate is made with the reagents properly balanced to assure neutrality. These solution are used to obtain a deproteinized filtrate according to the method of Somogyi, M.: A Method for the Preparation of Blood Filtrates for the Determination of Sugar, J. Biol. Chem. 86: 655–663, 1930.

(1) 1.0 ml. of a 1:200 filtrate (or known glucose standard equivalent) is added to 6.0 ml. of working indicator reagent in a clean test tube. An appropriate blank is also run.

(2) The test tubes are placed in vigorously boiling water for 2.5 minutes and then cooled to room temperature in tap water.

(3) Spectrophotometric readings are made near the wave length of maximum absorbtion (454 m$\mu$.). The glucose concentration is in proportion to optical density as shown in FIG. 2.

As illustrated above, the chelated indicators of the present invention are prepared simply by contacting the copper with the chelating agent selected in liquid phase.

EXAMPLE II

*Analysis of glucose with copper-bathocuproine indicator*

*Concentrated indicator solution.*—50 mg. of the hydrated form of cupric sulfate is added to 50 ml. of an aqueous solution containing 200 mg. of bathocuproine sodium sulfonate. The water should be free of reducing substances and metallic ions. A copper chelate forms from this combination and is pale yellow. The cupric ion remains in solution when the concentrated indicator is added to an alkaline medium. The concentrate is stable at room temperature for several days and may be added to either an alkaline or acid solution in order to determine presence or concentration of reducing substances.

*Working reagent.*—5.0 ml. of the concentrated indicator solution is added to 95.0 ml. of an aqueous solution of 1% sodium carbonate. The reagent has a very pale yellow tint and does not show significant auto-reduction for two days at room temperature. The pH of the solution is 10.8.

*Analysis procedure.*—Oxalated venus blood is collected in the usual fashion. A drop of blood from the finger tip may be used if the latter is placed immediately in the sodium or barium hydroxide used to precipitate the proteins. A 1:400 barium or sodium hydroxide zinc sulfate filtrate in the manner taught by Somogyi (see Example I) is made with the reagents being properly balanced to assure neutrality.

(1) 1.0 ml. of filtrate (or known glucose standard equivalent) is added to 6.0 ml. of working indicator reagent in a clean test tube. An appropriate blank is also run.

(2) The test tubes are placed in vigorously boiling water for 2.5 minutes and then cooled to room temperature in tap water.

(3) Spectrophotometric readings are made near the wave length of maximum absorbtion (479 m$\mu$.). The glucose concentration is in proportion to optical density as shown in FIG. 3.

EXAMPLE III

*Analysis of glucose with copper-cuproine indicator*

An indicator working solution was prepared as in the preceding examples except that cuproine was used as the chelating agent. Blood serum was deproteinized by the method of Somogyi and analyzed for glucose as in the preceding examples. The results are shown in FIG. 4.

As previously noted prior methods were faced with the problem of reoxidation of the copper. In order to avoid the use of the restricted sugar tube, it has previously been proposed to add sulfate ions to the solution in the form of sodium sulfate for example. Studies in connection with the present invention have demonstrated that in the presence of the indicators described herein, the addition of more than 18% sodium sulfate serves to increase the density of the final color obtained. It has been found that the effect of the sulfate ion is of a reducing nature, and varies with the concentration of the sodium sulfate in the absence of other reducing substances, i.e., the greater the sulfate concentration, the greater the reducing effect on the copper indicator. Since the present method does not require the presence of sulfate ions, it is more nearly a true method for analyzing glucose in blood serum as compared with prior methods.

Prior methods have also included the presence of tartrate ions or other hydroxy acids in order to suspend the cupric ion in the solution for analyzing blood sugar. These materials are in themselves reducing substances and tend to make the direct determination of blood sugar impossible as their concentration is increased. Since the present method does not require these materials, it has obvious advantages over the prior methods as a ture glucose method.

Similarly, various workers in the past have modified blood sugar procedures through the use of diverse materials in the solution such as sodium bisulfite, alanine, sodium chloride, ammonium sulfate, and phosphate ions. These materials are neither beneficial nor necessary in the present method. It has been found that the presence of large amounts of many of these materials will reduce the indicator and must be compensated for in the blanks or by other means, if possible.

Acetate ions have been discovered to have a particular effect on the color development of the present indicators by glucose. It has been discovered that glucose will not reduce the present indicators in the presence of acetate ions from sodium acetate for example, when the acetate is substituted for the carbonate or other alkaline substances in the glucose method as illustrated in the preceding examples. On the other hand, uric acid and creatinine will reduce the indicators at room temperature as well as at elevated temperatures in the presence of acetate buffers ranging from a pH of about 5 to 8. It has been found that the best reduction of uric acid occurs near neutrality, while at the same time, there is a complete absence of the effect of the glucose monosaccharide.

These discoveries have led to one aspect of the present invention which enables an analysis to be made for uric acid and creatinine in the presence of glucose. Thus, if the sample to be analyzed contains glucose, it is only necessary to add sufficient acetate ions to bring the pH to about 5 to 8 whereupon the glucose will not interfere with the determination.

Figure 5:
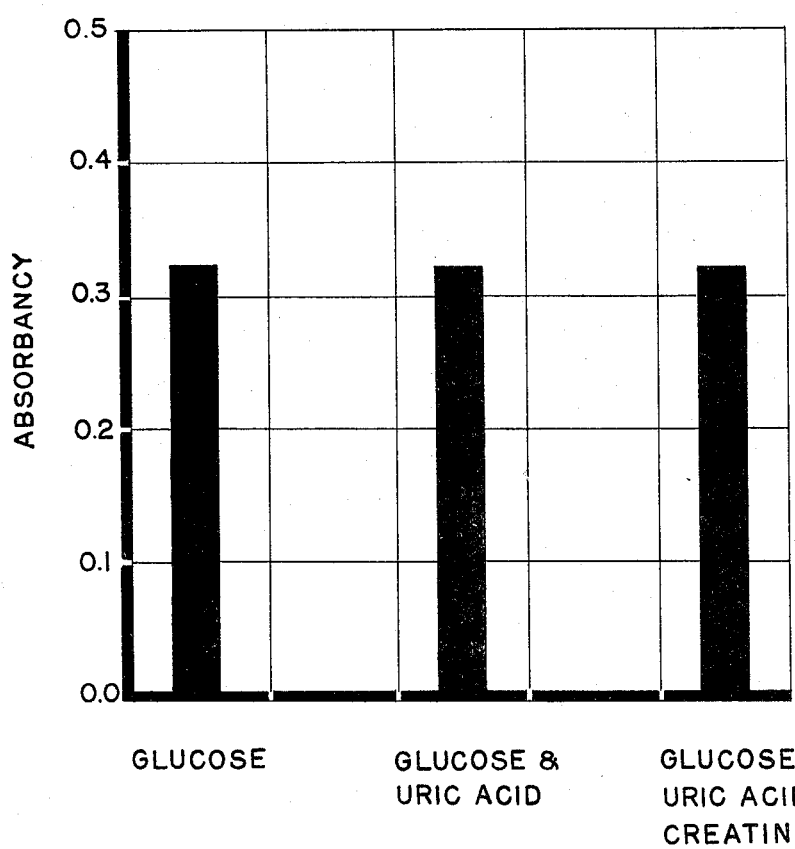

On the other hand, if the analysis is for glucose and the sample originally contains creatinine and uric acid as well as other reducing substances, these may be conveniently eliminated by selection of the proper protein precipitating method such as that of Somogyi. The Somogyi filtrate contains substantially only monosaccharide reducing agents and does not contain significant amounts of other reducing agents. Alternatively, the uric acid and creatinine need not be removed from the solution when glucose is being determined if the glucose determination is carried out as in the preferred embodiment in alkaline carbonate solution. It has been discovered that there is no significant effect from the uric acid or creatinine on the analysis of monosaccharides when these two substances are added in physiological concentrations directly to the glucose solution being analyzed. See FIG. 5 for graphic results of experiments using a procedure similar to Example I except for the noted additional reducing agents.

When analyzing for creatinine and uric acid, the reduction characteristics of one in the presence of the other may be differentiated from each other by the particular reducing conditions applied. Thus when a sample to be analyzed contains both uric acid and creatinine, they may be placed in combination with an indicator as in Example I, and if the reducing conditions are properly selected, the reducing effect of uric acid alone may be selectively determined.

Suitable selective reducing conditions which preferentially reduce only the uric acid have been determined to include an adjustment of the pH to about 5–6. If heat is applied the reduction is accelerated. If the pH is adjusted to about 7–8, uric acid and creatinine will change the indicator. The amount of uric acid therefore may be determined first by using selective conditions, and if the total is then determined, the amount of creatinine is easily computed by taking the difference of the two values. It will be appreciated that the above conditions for selective reduction are merely illustrative and that considerable variation therefrom could be practiced and the same result obtained.

When blood serum is used in the analysis for blood sugar, the Somogyi method for deproteinization is preferably followed. This produces a clear filtrate most satisfactory for executing the present method. However, if the blood serum is to be analyzed for uric acid or other reducing substances, the Somogyi filtrate may not be used, since the Somogyi filtrate contains substantially only monosaccharide reducing substances. Consequently, in this instance a filtrate may be obtained by the method of Folin and Wu: J. Biol. Chem., 38, 81 (1919), employing tungstic acid. However, it has been noted that the filtrates made in accordance with the Folin and Wu tungstic acid procedure are sometimes turbid as compared with the Somogyi filtrate. The turbidity is not observed when water standards of either uric acid or glucose are added to the indicator and acetate or carbonate solutions.

It has been discovered that the addition of a cationic surface active agent to the tungstic acid filtrate will eliminate the turbidity. An amount sufficient to clear the solution should be used. It has been found that about 1% of methylbenzethonium chloride (octyl cresoxy ethoxy ethyl dimethyl benzyl ammonium chloride monohydrate) may be added to obtain this clarity of the filtrate, although it will be appreciated that other cationic surface active agents may similarly be used. Filtrates treated in this manner remain free of turbidity and may be applied to the uric acid determination or other reducing substance determination including the monosaccharide determination where the Somogyi filtrate is not used. The following example illustrates the foregoing points in the determination of uric acid:

EXAMPLE IV

*Determination of uric acid in blood serum*

*The indicator solution.*—Any of the substituted phenanthrolines or biquinolines discussed herein may be used for the reaction. In this example the cupric chelate of neocuproine hydrochloride was employed and added to a 1% sodium acetate solution in a concentration identical to that used in the monosaccharide analysis in Example I.

*Filtrate reagents.*—$1/12$ normal sulphuric acid was used for the tungstic acid filtrate made in accordance with the teachings of Folin and Wu. Sufficient methylbenzethonium chloride is added to the acid to make a .3% solution. 10% sodium tungstate is used for the tungstic acid filtrate.

*Procedure.*—The tungstic acid filtrate is made by adding 8 volumes of sulphuric acid solution to 1 volume of blood serum. After mixing, 1 ml. of 10% sodium tungstate is added to precipitate the proteins. The precipitate is filtered in the usual fashion.

(1) 2.0 ml. of filtrate thus prepared is added to 5.0 ml. of the color reagent in acetate solution. Appropriate controls and blanks are handled in a similar manner.

(2) The mixture is placed in boiling water for one minute and then cooled to room temperature and quantitated in a spectrophotometer.

A linear relationship between optical density and concentration of uric acid is observed. Under the particular conditions herein employed, i.e, presence of acetate ions and if the pH is about 5–6, the presence of glucose and/or creatinine do not affect the observed results.

The following illustrates the applicability of the invention to other reducing substances.

EXAMPLE V

*Determination of ascorbic acid*

A working indicator solution was prepared with neocuproine and cupric ion in a molecular ratio of 2:1 respectively, by a procedure similar to Example I except that the solution was made acid. 2.0 ml. samples of a 1:10 dilution of an ascorbic acid standard in the noted concentrations were added to 5.0 ml. portions of the indicator. Spectrophotometric readings were made after four minutes at 454 m$\mu$. using a 10 mm. cuvette. The results are illustrated in FIG. 6.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. A method for the colorimetric quantitative analysis of reducing and oxidizing substances capable of reacting with copper to change the valence state of the copper comprising:

(a) contacting at least one of said substances in liquid phase with an indicator consisting essentially of a preformed chelate of substantially completely bound copper with a member of the group selected from 2,2′-biquinolines and 2,9-substituted-1,10-phenanthrolines under valence changing conditions for said copper;

(b) and then measuring the amount of copper valence change by reference to the light transmittance of said liquid phase, and determining the amount of substance being analyzed by comparing the light transmittance to a standard.

2. A method in accordance with claim 1 wherein said indicator is formed with cuproine.

3. A method in accordance with claim 1 wherein said indicator is formed with neocuproine.

4. A method in accordance with claim 1 wherein said indicator is formed from bathocuproine.

5. A method in accordance with claim 1 wherein said indicator is formed from a water soluble salt of said selected member.

6. A method for the colorimetric quantitative analysis of reducing substances in blood comprising:
(a) contacting a predetermined quantity of the blood with an indicator consisting essentially of a preformed chelate of substantially completely bound copper in cupric state with a member of the group selected from 2,2′-biquinolines and 2,9-substituted-1,10-phenanthrolines under copper reducing conditions in liquid phase;
(b) and then measuring the amount of copper reduced to the cuprous state by reference to the light transmittance of said liquid phase, and determining the amount of substance being analyzed by comparing the light transmittance to a standard.

7. A method in accordance with claim 6 wherein the analysis is executed on the cellular fraction of blood whereby glutathione may be determined.

8. A method in accordance with claim 6 wherein the analysis is executed on the plasma fraction of blood.

9. A method in accordance with claim 8 wherein the analysis is executed on deproteinzed blood serum in order to determine the amount of a reducing substance selected from the group consisting of glucose, uric acid, ascorbic acid, and creatinine.

10. A method for the colorimetric quantitative analysis of glucose in deproteinzed blood serum substantially free from other reducing substances comprising:
(a) contacting a predetermined quantity of said serum with an indicator consisting essentially of a preformed chelate of substantially completely bound copper in cupric state with a chelating agent selected from the group consisting of cuproine, neocuproine, bathocuproine and water soluble salts thereof, in alkaline aqueous solution of predetermined volume and under copper reducing conditions;
(b) and then measuring the amount of copper that is reduced to the cuprous state by reference to the light transmittance of said aqueous solution, and determining the amount of substance being analyzed by comparing the light transmittance to a standard.

11. A method for the colorimetric quantitative analysis of glucose in the presence of other reducing substances in deproteinized blood serum comprising:
(a) contacting a predetermined quantity of said serum with an indicator consisting essentially of a preformed chelate of substantially completely bound copper in cupric state with a member of the group selected from 2,2′-biquinolines and 2,9-dialkyl-1,10-phenanthrolines in an aqueous solution of predetermined volume containing carbonate ions and having a pH of at least about 10;
(b) heating the same to reduce copper in cupric form to cuprous form;
(c) and then measuring the amount of copper that has been reduced to cuprous form by reference to the light transmittance of said aqueous solution, and determining the amount of substance being analyzed by comparing the light transmittance to a standard.

12. A method for the colorimetric quantitative analysis of the total of both uric acid and creatinine in the presence of other reducing substances in deproteinized blood serum comprising:
(a) contacting a predetermined quantity of said blood serum with an indicator consisting essentially of a preformed chelate of substantially completely bound copper in cupric state with a member of the group selected from 2,2′-biquinolines and 2,9-substituted-1,10-phenanthrolines under copper reducing conditions in an aqueous solution of predetermined volume having a pH of about 7–8 and containing acetate ions;
(b) and then measuring the amount of copper reduced to the cuprous state by reference to the light transmittance of said aqueous solution, and determining the amount of substance being analyzed by comparing the light transmittance to a standard.

13. A method in accordance with claim 12 wherein substantially only uric acid is determined by employing selective reducing conditions comprising a solution pH of about 5–6 so that substantially only the uric acid reduces the copper.

14. A method for the colorimetric quantitative analysis of uric acid in blood comprising:
(a) deproteinizing blood by precipitating the protein with tungstic acid;
(b) adding a cationic surface active agent to prevent turbidity;
(c) separating the liquid phase of the blood from the precipitated protein;
(d) contacting a predetermined quantity of said liquid phase with an indicator consisting essentially of a preformed chelate of substantially completely bound copper in cupric state with a member of the group selected from 2,2′-biquinolines and 2,9-substituted-1,10-phenanthrolines in an aqueous solution of predetermined volume containing sufficient acetate ions for selective reduction of copper by uric acid;
(e) heating said indicator-blood solution to accelerate the reduction of the copper by the uric acid therein;
(f) and then measuring the amount of copper reduced to the cuprous state by reference to the light transmittance of the solution, and determining the amount of uric acid by comparing the light transmittance to a standard.

15. A method in accordance with claim 14 wherein the analysis is executed on blood serum, the surface active agent is methylbenzethonium chloride, and the selective reduction comprises adjusting the pH of the solution to about 5–6.

References Cited by the Examiner

Borchardt et al.: Determination of Trace Amounts of Copper. In Analytical Chemistry, 29(3), pp. 415–419, March 1957.

Brandt et al.: Polysubstituted 1,10-Phenanthrolines and Bipyridines as Multiple Range Redox Indicators. In Analytical Chemistry, 21(11), pp. 1313–19, November 1949.

Klein et al.: New Color Reagent for Determination of Hexoses. In Analytical Chemistry, 25(5), pp. 771–4, May 1953.

Smith, G. F.: The Ferroine, Cuproine, and Terroine Reacting Organic Analytical Reagents. In Analytical Chemistry, 26(10), pp. 1534–38, October 1954.

Wagreich et al.: Copper-EDTA Acid Complex in Alaline Solution. In Analytical Chemistry, 25(12), pp. 1925–6, December 1953.

MORRIS O. WOLK, *Primary Examiner.*

JAMES H. TAYMAN, JR., JOSEPH SCOVRONEK,
*Examiners.*

J. J. MULLEN, *Assistant Examiner.*